DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 1, 1970

881 O.G. 22

T881,009

DIRECT-PRINT SILVER HALIDE PHOTOGRAPHIC PROCESSES

John R. Tinney, % Kodak Park Works, Rochester, N.Y. 14650

Filed May 14, 1970, Ser. No. 37,301
Int. Cl. G03c *5/32*
U.S. Cl. 96—45.2
No Drawing. 11 Pages Specification

There are disclosed processes for forming visible images on direct-print silver halide systems. The silver halide systems disclosed contain silver halide grains which have trivalent metal ions occluded therein. The silver halide systems have a halogen acceptor contiguous to the trivalent metal containing silver halide grains. In one embodiment, an image is produced on a direct-print film by applying a potential or an electric charge to the surface of a film coated with the direct-print emulsion. This is accomplished by rendering the direct-print material conductive by soaking it in a salt solution and thereafter establishing positive and negative contacts on the film. A visual record of an input signal from one or more stationary negative electrodes may be obtained by continuously moving a sheet coated with the direct-print emulsion in contact with the electrodes to produce graphic chart lines on the emulsion. The image thus obtained may be intensified by the application of heat, e.g., by heating to 200° C. or higher.

According to another aspect, the direct-print system is exposed to light to form a latent image and heated to a temperature of at least 300° F. to repress print-out ability of the silver halide. The latent image is subsequently photodeveloped by exposing it for a short duration to an intense flash, e.g., by flashing with a 100 watt-second 800 microsecond duration xenon light source, while maintaining the film at an elevated temperature, e.g., at a temperature of 150° C. A visible image is thus produced very rapidly. The image may be further photo-developed by conventional means to produce a high quality image having a low background and a high Dmax.

Silver halide emulsions and elements described contain silver halide grains formed in the presence of a trivalent metal ion, such an antimony, bismuth, arsenic, gold, iridium, rhodium, and halogen acceptors. They can contain dispersing agents, coating aids, plasticizers, sensitizing dyes, hardeners, and other suitable addenda such as described in U.S. Pat. 3,447,927 of Bacon and Barbier, issued June 3, 1969 (columns 2–6).